US011105369B2

(12) United States Patent
Taylor et al.

(10) Patent No.: US 11,105,369 B2
(45) Date of Patent: Aug. 31, 2021

(54) METHOD OF PRODUCING COMPOSITE COMPONENT HAVING BRASS OR BRONZE USING SINTER FIT

(71) Applicant: GKN Sinter Metals, LLC, Auburn Hills, MI (US)

(72) Inventors: Alan C. Taylor, Lake Orion, MI (US); Ian W. Donaldson, Jefferson, MA (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 371 days.

(21) Appl. No.: 15/060,874

(22) Filed: Mar. 4, 2016

(65) Prior Publication Data

US 2016/0256929 A1    Sep. 8, 2016

Related U.S. Application Data

(60) Provisional application No. 62/129,144, filed on Mar. 6, 2015.

(51) Int. Cl.

| *F16C 33/14* | (2006.01) |
|---|---|
| *F16C 33/12* | (2006.01) |
| *C22C 9/01* | (2006.01) |
| *B32B 15/01* | (2006.01) |
| *B22F 7/04* | (2006.01) |
| *B22F 5/10* | (2006.01) |
| *B22F 7/08* | (2006.01) |
| *B22F 7/06* | (2006.01) |
| *C21D 1/18* | (2006.01) |
| *C22C 9/04* | (2006.01) |

(Continued)

(52) U.S. Cl.
CPC .......... *F16C 33/145* (2013.01); *B32B 15/015* (2013.01); *C22C 9/01* (2013.01); *C22C 9/02* (2013.01); *C22C 9/04* (2013.01); *C22C 9/10* (2013.01); *C22C 38/00* (2013.01); *F16C 33/121* (2013.01); *F16C 33/122* (2013.01); *B22F 5/10* (2013.01); *B22F 7/062* (2013.01); *B22F 7/08* (2013.01); *B22F 2007/042* (2013.01); *B22F 2007/045* (2013.01); *B22F 2998/10* (2013.01); *C21D 1/18* (2013.01); *F16C 2204/10* (2013.01); *F16C 2204/12* (2013.01)

(58) Field of Classification Search
CPC . B32B 15/00; F16C 33/00; C22C 1/00; B22F 5/00

See application file for complete search history.

(56) References Cited

U.S. PATENT DOCUMENTS

| 2,226,263 A | 12/1940 | Sandler et al. |
|---|---|---|
| 4,595,556 A | 6/1986 | Umeha et al. |

(Continued)

FOREIGN PATENT DOCUMENTS

| CN | 1141959 A | 2/1997 |
|---|---|---|
| CN | 1141961 A | 2/1997 |

(Continued)

OTHER PUBLICATIONS

English translation of CN 1141961.*

(Continued)

*Primary Examiner* — Xiaobei Wang
(74) *Attorney, Agent, or Firm* — Quarles & Brady LLP

(57) ABSTRACT

A method of forming a composite component having a brass or bronze powder metal portion sinter fit into a supporting, ferrous portion.

23 Claims, 2 Drawing Sheets

(51) Int. Cl.
*C22C 9/02* (2006.01)
*C22C 38/00* (2006.01)
*C22C 9/10* (2006.01)

(56) References Cited

U.S. PATENT DOCUMENTS

| | | | |
|---|---|---|---|
| 6,854,183 | B2 | 2/2005 | Greene et al. |
| 2009/0034893 | A1* | 2/2009 | Back .................. F16C 17/02 384/476 |
| 2009/0202855 | A1* | 8/2009 | Saxton ................ B22F 7/004 428/546 |
| 2013/0156626 | A1 | 6/2013 | Roth-Fagaraseanu et al. |
| 2019/0003007 | A1* | 1/2019 | Venkatasurya ........ C21D 6/008 |

FOREIGN PATENT DOCUMENTS

| | | | |
|---|---|---|---|
| CN | 101670439 | A | 3/2010 |
| CN | 101699084 | A | 4/2010 |
| CN | 101829785 | A | 9/2010 |
| EP | 2165790 | A1 | 3/2010 |
| JP | 3045460 | B2 | 5/2000 |

OTHER PUBLICATIONS

English translation of CN 1141959.*
ASM International, "Practical Heat Treating, 2nd Edition—Chapter 2: Fundamentals of Heat Treating of Steel", 2006, pp. 9-25. (Year: 2006).*
Ross, John. "Why materials and manufacturing impact bearing performance", Aug. 1, 2000, <http://www.machinedesign.com/linear-motion/why-materials-and-manufacturing-impact-bearing-performance>, accessed Apr. 5, 2018. (Year: 2000).*
English machine translation of Zhang (CN 101699084), EPO, accessed Nov. 1, 2018.*
Apelian, "Particulate Processing (Powder Metallurgy)", Encyclopedia of Materials: Science and Technology 2nd edition, Elsevier, 2001, pp. 6761-6769 (pp. 1-8 in reference). (Year: 2001).*
The Patent Office of the State Intellectual Property Office of the People'S Republic of China, Application No. 201610124269.X, Office Action and Search Report, Jun. 28, 2017.
Excerpt entitled "Sintering Copper-Based Materials" from p. 412 of the Heat Treater's Guide, Practices and Procedures for Nonferrous Alloys, 4 pages, copyright 1996, ASM International, Materials Park, Ohio.
The State Intellectual Property Office of the People's Republic of China, Second Office Action and Search Report, Application No. 201610124269.X, dated Jul. 25, 2018, 23 pages.
China National Intellectual Property Administration, Decision on Rejection, Application No. 201610124269.X, dated Nov. 15, 2018, 12 pages.
China National Intellectual Property Administration, Notice on Reexamination, Application No. 201610124269.X, dated Sep. 23, 2019, 18 pages.
Intellectual Property India, Examination Report, Application No. 201634007681, dated Oct. 23, 2019, 6 pages.
Japan Patent Office, Notification of Reason for Refusal, Application No. 2016-041752, dated Feb. 4, 2020, 8 pages.
Japan Patent Office. Decision of Refusal for application 2016-041752. dated Sep. 29, 2020. With translation.

* cited by examiner

METHOD OF PRODUCING COMPOSITE COMPONENT HAVING BRASS OR BRONZE USING SINTER FIT

CROSS-REFERENCE TO RELATED APPLICATION

This application claims the benefit of the filing date of U.S. Provisional Patent Application No. 62/129,144 filed Mar. 6, 2015, which is hereby incorporated by reference for all purposes as if set forth in its entirety herein.

STATEMENT OF FEDERALLY SPONSORED RESEARCH OR DEVELOPMENT

Not applicable.

FIELD OF THE INVENTION

This disclosure relates to powder metallurgy. In particular, this disclosure relates to methods of joining separate parts made from different materials to form a composite component in which at least one of the component portions is made from a copper containing powder metal by sintering to form a brass or bronze portion of the composite component.

BACKGROUND

Brass and bronze materials are common copper-based alloys that are often used in bearing or bushing type applications. Copper is alloyed with zinc to form brass, whereas copper is usually alloyed with tin to form bronze (although other elements such as phosphorus, manganese, aluminum, silicon, and nickel may also be used in bronzes). Solid solubility of the alloying element or elements in copper often limits the amount of the alloying element in the copper while maintaining a single phase. For example at 20° C., zinc has a solid solubility of approximately 37 percent in copper whereas tin has a solid solubility of approximately 10 percent in copper.

In some prior applications, to produce a bronze bearing surface, loose bronze powder would be applied to a backing or steel strip. For example, in U.S. Pat. No. 2,226,263, a bronze powder is applied to a steel backing strip, the powder is smoothed for consistency, and then the powder is sintered to the strip. The composite strip is then cold rolled to reduce the thickness of the layer. The rolled strip is then re-heated to sintering temperatures and re-rolled. As another example, in U.S. Pat. No. 6,854,183 (and col. 3, lines 30-50 in particular), loose bronze powder is applied to a backing and heated, sintered, rolled, then sintered again to improve density of the bearing surface.

Thus, conventional methods of production of bronze layers can be time-consuming, requiring multiple steps, and demand careful application of a powder metal to a surface. There is a need for improvements to the fabrication of brass and bronze surfaces.

SUMMARY OF THE INVENTION

Disclosed herein are improved methods of producing a composite material having a brass or bronze portion and a supporting or backing portion. Instead of packing loose powder material on a surface, sintering, rolling, and repeating as in the prior art methods, in the new method the powder metal is compacted into a powder metal compact which exhibits a dimensional change during sintering. In order to form an interference fit between the brass or bronze compact and the supporting portion, the compact is sized to be received adjacent to the supporting portion. Upon sintering, the compact exhibits a slight dimension change, which varies based on the exact material composition, but typically is a percentage in the low single digits. By carefully engineering the dimensions of the compact to the support, the compact can be sinter fit onto the supporting portion (that is to say, the sintered form of the compact can be joined onto the support portion by a dimensional change of the compact that occurs during sintering).

There are some very unique features that may be associated with the sinter fitting of a brass or bronze powder metal component onto a steel component.

One notable feature of the sintered brass or bronze parts, especially in comparison to sintering of the majority of other powder metals, is that brass and bronze exhibit a unique sinter response in which the brass or bronze can exhibit either dimensional shrinkage or expansion during sintering. In contrast, the majority of other powder metal materials only shrink dimensionally after effective sintering. In this invention, this flexibility in dimensional change is harnessed in order to provide heretofore unseen structural arrangement and mechanical joining through dimensional change.

Another notable feature is that the typical sintering temperatures for brass and bronze correspond to the austenitization temperature for many steels and alloys thereof. Thus, by careful selection of the support or backing material, the sintering step may not only result in sintering of a compact for sinter fitting the compact to the support or backing material, but may also for austenite in the ferrous portion of the composite component. Immediately after sintering, the composite component might be quenched and tempered to form martensite. Thus, the sintering step can synergistically also provide the initial heat treatment step for the ferrous portion of the component.

According to one aspect of the invention, a method of forming a composite component having a sintered copper alloy powder metal portion and a ferrous portion is disclosed. The method includes compacting a copper-containing powder metal to form an unsintered copper-containing powder metal compact. This copper-containing powder metal includes copper and one or more alloying elements. The unsintered copper-containing powder metal compact is then positioned adjacent to the ferrous portion and sintered to form the sintered copper alloy powder metal portion of the composite component. The aforementioned alloying elements provide the sintered copper alloy powder metal portion with a material composition of brass or bronze. During the step of sintering the unsintered copper-containing powder metal compact to form the sintered copper alloy powder metal portion, a dimensional change in the unsintered copper-containing powder metal compact results in an interference fit of the sintered copper alloy powder metal portion with the ferrous portion. This dimensional change created by sintering joins the sintered copper alloy powder metal portion and the ferrous portion together to form the composite component.

In some forms of the method, due to the material composition of the sintered copper alloy powder metal portion (that is, brass or bronze), the dimensional change in the unsintered copper-containing powder metal compact to the sintered copper alloy powder metal portion during sintering involves an increase of a dimension to cause the interference fit. This expansion of dimension upon sintering is relatively rare as, typically, sintering results in densification of a less than fully dense powder metal compact. However, the sinter response of brass and bronze can be potentially manipulated increasing green densities such that, rather than the traditional shrinking of dimensions, some of the dimensions can expand. As one non-limiting example, bronze blends of 90 Cu-10 Sn elemental powder compacted to a green density of 7.4 g/cm$^3$ and sintered at 1555° F. have been found to exhibit dimensional expansion in the amount of 2 percent after approximately 20 minutes of sintering. In contrast, by downward manipulation of the green density (into a green density of approximately 6.0 g/cm$^3$) can result in dimensional shrinkage of over 2 percent after 20 minutes of sintering. Thus, this non-limiting example is made to show the complex sinter response of brass and bronze powder formulations to sintering in such a way that dimensions might be made to increase or decrease.

In the case in which the unsintered copper-containing powder metal compact is to expand, this means that the unsintered copper-containing powder metal compact may be positioned adjacent to the ferrous portion by placing the unsintered copper-containing powder metal compact inside an opening in the ferrous portion. Then, upon sintering, the unsintered copper-containing powder metal compact may expand as the unsintered copper-containing powder metal compact is sintered to form the sintered copper alloy powder metal portion, thereby creating the interference fit between an outer periphery of the sintered copper alloy powder metal portion and an inner periphery of the ferrous portion. Put another way, when this sintering occurs and if the portions have a generally cylindrical interface, a circumference of the unsintered copper-containing powder metal compact may increase during sintering to form the sintered copper alloy powder metal portion, and this increase in circumference may result in the interlock or sinter fit.

In the case in which the unsintered copper-containing powder metal compact is to shrink, the unsintered copper-containing powder metal compact may be positioned adjacent to the ferrous portion by placing the ferrous portion inside an opening in the unsintered copper-containing powder metal compact. Then, upon sintering, the unsintered copper-containing powder metal compact may shrink as the unsintered copper-containing powder metal compact is sintered to form the sintered copper alloy powder metal portion, thereby creating the interference fit between an inner periphery of the sintered copper alloy powder metal portion and an outer periphery of the ferrous portion. Again, put another way, when this sintering occurs and if the portions have a generally cylindrical interface, a circumference of the unsintered copper-containing powder metal compact may decrease during sintering to form the sintered copper alloy powder metal portion, and this decrease in circumference may result in the interlock or sinter fit.

As used herein, the terms "brass" and "bronze" are used in their conventional manner as being common names to refer to certain classes of copper-containing alloys. For example, in brass, copper is combined primarily with zinc as an alloying element. In bronze, copper is combined with one or more of tin, aluminum, silicon, and nickel. The recited alloying elements that are listed are representative but are not exclusive; that is, other alloying elements may also be included in the copper alloy in small amounts without necessarily excluding them from the categories of brass and bronze.

The ferrous portion may be iron, an iron alloy, steel, or a steel alloy. The ferrous portion may be fabricated in a number of ways including, but not limited to, wrought forming, casting, and powder metallurgy. Other non-ferrous supporting structures or backings are also contemplated as being potentially workable with the sinter fitting of the brass/bronze component on to the supporting structure.

It is contemplated that the formed composite component may be used for production of bearings, bearing components, bushings, and so forth. As such the composite component might be characterized as a bearing and the sintered copper alloy powder metal portion may include a bearing surface (that is, a surface on which another component bears). As bearings are often ring like, it is contemplated that the sintered copper alloy powder metal portion and the ferrous portion may both be annular.

One notable advantage of the sinter fitting of brass or bronze around or into a steel or steel alloy is that the sintering of the brass or bronze occurs at an austenitizing temperature for steel. Thus, during the sintering step, sintering the unsintered copper-containing powder metal compact occurs at a temperature which also austenitizes the ferrous portion of the composite component. Accordingly, the method may further include a step of cooling or quenching the composite component after sintering, in which the cooling occurs rapidly enough to transform at least some of the austenite into martensite. The method of making the composite component can further include the tempering of the martensite in the ferrous portion of the composite component.

In some forms of the method, after the sintering step, it is contemplated that the method may further include the steps of sizing the sintered copper alloy powder metal portion and/or impregnating the sintered copper alloy powder metal portion with oil.

According to another aspect of the invention, a composite component is provided having a sintered copper alloy powder metal portion and a ferrous portion. The sintered copper alloy powder metal portion has a material composition that is either bronze or brass. The ferrous portion is adjacent to and is frictionally engaged (and perhaps to some extent diffusively bonded) with the sintered copper alloy powder metal portion as a result of a dimensional change of an unsintered copper-containing powder metal during the sintering of the unsintered copper-containing powder metal compact to form the sintered copper alloy powder metal portion.

As noted above, the ferrous portion may be positioned inside the sintered portion or vice-versa. In some forms, the ferrous portion may be located in an opening of the sintered copper alloy powder metal portion and an inner periphery of the sintered copper alloy powder metal portion may form an interference fit with an outer periphery of the ferrous portion. In other forms, the sintered copper alloy powder metal portion is located in an opening of the ferrous portion and an inner periphery of the ferrous portion may form an interference fit with an outer periphery of the sintered copper alloy powder metal portion.

Again, the sintered copper alloy powder metal portion may be brass or bronze as discussed above and the ferrous portion may be iron, an iron alloy, steel, or a steel alloy. While the sintered copper alloy powder metal portion is formed using powder metallurgy, the ferrous portion may be formed using wrought forming, casting, or powder metallurgy.

The composite component may be a bearing in which the sintered copper alloy powder metal portion includes a bearing surface. Such bearings are often ring-like, and it is contemplated that the sintered copper alloy powder metal portion and the ferrous portion may both be annular. Further, the sintered copper alloy powder metal portion may be impregnated with oil.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION OF THE PREFERRED EMBODIMENTS

Figure 1:
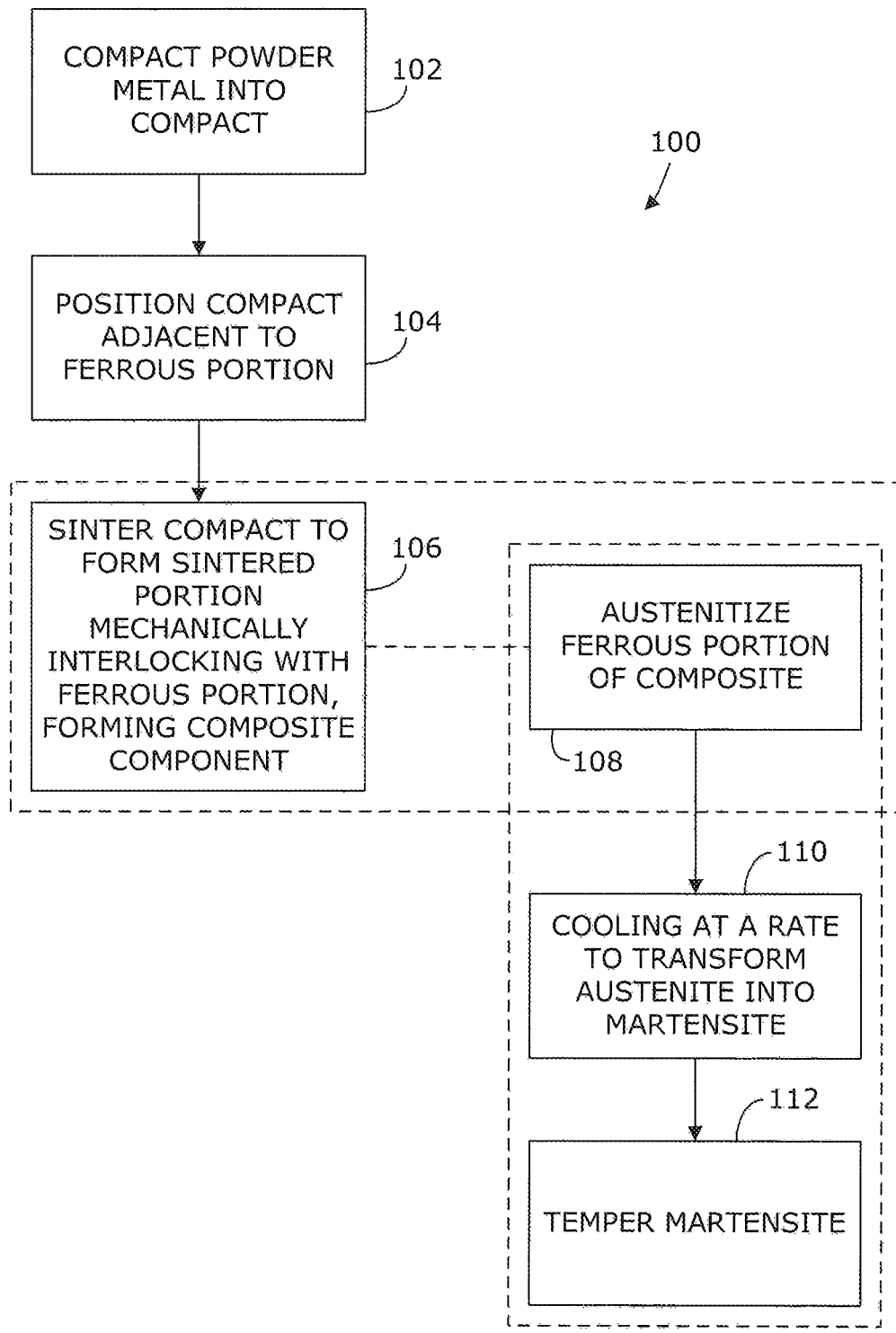
FIG. 1 is a flowchart illustrating the sequential steps of a method of making a composite component according to one aspect of the present invention.
Figure 2A:
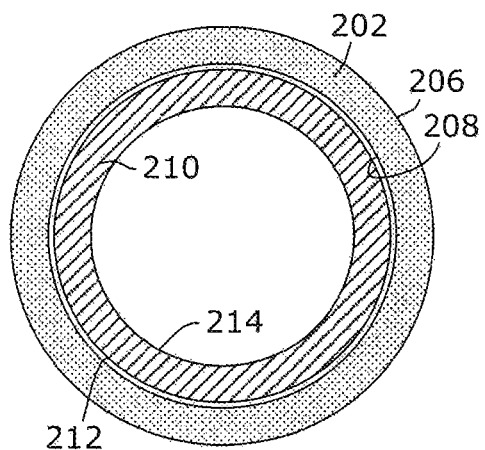
FIG. 2A is a cross-sectional side view taken through a ferrous portion and an unsintered powder metal compact in which the ferrous portion is received inside an opening of the unsintered powder metal compact.
Figure 2B:
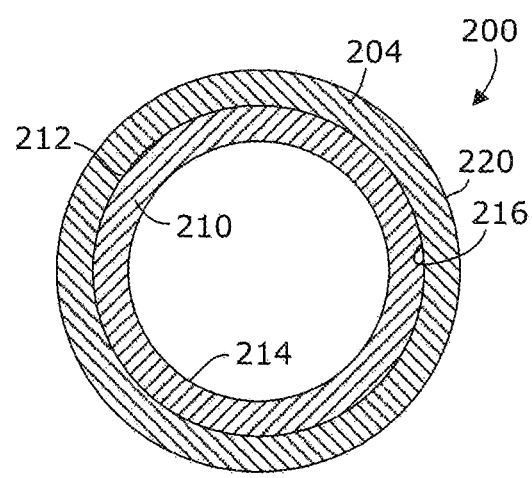
FIG. 2B is a cross-sectional side view taken through a composite component formed by sintering the unsintered powder metal compact around the ferrous portion of FIG. 2A to form the sintered portion of the composite component, whereby during the sintering to form the sintered portion, the powder metal compact dimensionally shrinks around the ferrous portion to "sinter fit" the portions together or form an interference fit therebetween.
Figure 3A:
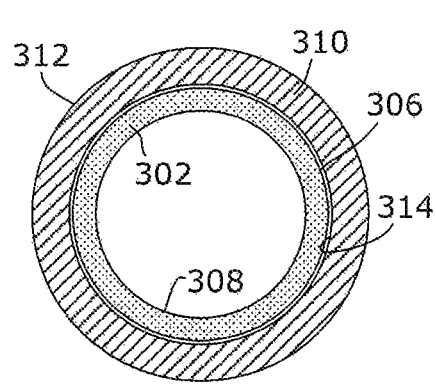
FIG. 3A is a cross-sectional side view taken through a ferrous portion and an unsintered powder metal compact in which the unsintered powder metal compact is received inside an opening of the ferrous portion.
Figure 3B:
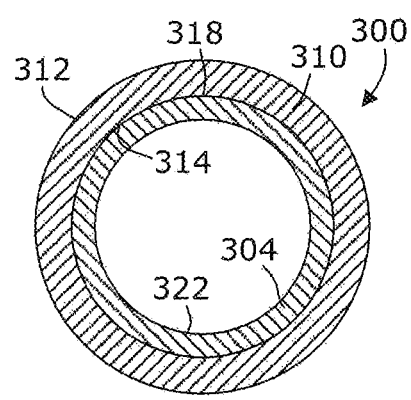
FIG. 3B is a cross-sectional side view taken through a composite component formed by sintering the unsintered powder metal compact inside the ferrous portion of FIG. 3A to form the sintered portion of the composite component, whereby during the sintering to form the sintered portion, the powder metal compact dimensionally expands within the ferrous portion to "sinter fit" the portions together or form an interference fit therebetween.

Referring to FIGS. 1, 2A, 2B, 3A, and 3B, a method 100 is illustrated in FIG. 1 for the production of a composite component, such as the resultant composite components 200, 300 that are illustrated in FIGS. 2B and 3B, respectively. The various steps now described are sequentially performed in order to provide the desired macrostructure for the composite component and microstructure.

In a first step 102, a copper-containing powder metal is compacted or compressed to form an unsintered copper-containing powder metal compact, such as the compact 202 or 302 in FIGS. 2A and 3A. Because such compaction techniques are well-known in the art, only a brief explanation of the compaction process will be made here. In short, the powder metal (usually with some amount of binder and lubricant) is typically presented by a feed shoe into a cavity of a tool and die set installed in a uniaxial press. With the feed shoe withdrawn, upper and lower tool members are cycled to apply a compaction force to the powder metal in the die cavity to form a compact from the previously loose powder metal. The binder and lubricant holds the compacted particles of the powder metal compact together and this compact is ejected from the die by raising the lower tools and/or lowering the die. For annular compacts as illustrated, there may also be a core rod that is used to form a central opening in the compact.

It should be appreciated that these compacts 202 are the precursor to the sintered copper alloy powder metal portion 204 and 304, which are either brass or bronze in material composition. Accordingly, the copper-containing powder metal includes copper and at least one or more of zinc (if brass) or tin, aluminum, silicon, and nickel (if bronze). It is contemplated that copper and alloying element(s) may be separate elemental powders that are admixed with one another. However, it is also contemplated that the alloying element(s) may be at least partially pre-alloyed or presented together as part of a master alloy powder.

At this point, it should be noted that the properties of the compacts can have a significant and drastic impact on the dimensional sinter response of the powder metal compacts. Perhaps among the most significant of these properties is the green density of the compact which is effectively the density of the as-compacted part and which can be altered, for example, by changing the compaction pressure or the particle size distribution of the powders. Although different powder formulations may behave and respond differently, it has been generally observed that greater green densities tend to result in as-sintered parts that have expanded dimensions after sintering while compacts having lower green densities are more likely to exhibit dimensional shrinkage after sintering. Compacts of certain green densities will expand and then contract during sintering, depending on the time duration of the sinter. Suffice to say, given the number of potential variables (and the variability observed across different pieces of industrial equipment), one having ordinary skill in the art may need to refer to the literature and/or run a number of initial trials to determine a set of parameters to obtain the exact sinter response desired for a particular powder metal composition and further tune conditions based on observed dimensional variation during production runs.

In view of the above, given that the compact 202 in FIG. 2A will shrink and the compact 302 in FIG. 3A will expand during sintering, the compact 202 should be compacted with green properties that will promote dimensional shrinkage during sintering, while the compact 302 should be compact with green properties that will promote dimensional expansion during sintering.

Returning to the exemplary compacts 202 and 302 in FIGS. 2A and 3A, and given the ring bearing type construction they will be used in, these compacts 202 and 302 are generally annular in shape, having a radially-outward facing surface 206 and 306 and a radially-inward facing surface 208 and 308.

Continuing on through the method 100, in step 104 the compact 202 and 302 is then positioned adjacent to a ferrous portion 210 and 310 as illustrated in FIGS. 2A and 3A, respectively. The ferrous portion 210 or 310 will act as a support or backing portion to structurally support the brass or bronze sintered portion and may be iron, an iron alloy, steel, a steel alloy, or potentially other support or backing materials. Again, because a ring-like bearing assembly is being formed, the ferrous portions 210 and 310 have a radially-outward facing surface 212 and 312 and a radially-inward facing surface 214 and 314. In the case of FIG. 2A, the radially-inward facing surface 208 of the compact 202 can serve as an opening for the reception of the ferrous portion 210 such that the radially-outward facing surface 212 of the ferrous portion 210 faces the radially-inward facing surface 208 of the compact 202. In the case of FIG. 3A, the radially-inward facing surface 314 of the ferrous portion 310 can serve as an opening for the reception of the compact 302 such that the radially-outward facing surface 306 of the compact 302 faces the radially-inward facing surface 314 of the ferrous portion 310.

In any event there is only a minimal clearance between the compact 202 and 302 and the ferrous portion 210 and 310 such that, upon further sintering and dimensional change of a few percentage points, the compact 202 and 302 will adjust in size to interfere with the ferrous portion 210 and 310 to join them together. What constitutes an acceptable initial clearance will depend on the amount of dimensional change that is expected to occur during sintering.

It is noted that in the disclosed embodiments, the compact 202 and 302 and the ferrous portions 210 and 310 are both tubular or annular in shape and are telescopically received into one another such that the inner circumference of one of the two faces the outer circumference of the other. It should be appreciated that while the parts depicted are tubular or annular in shape, that variations on this geometry are contemplated. For example, the circumferences may have surface features form thereon (e.g., splines) that may or may not exactly match the mating component. Further, while a circular cross section is shown, it is contemplated that this geometry might be varied in certain applications.

In any event, with the compact 202 or 302 positioned adjacent to the ferrous portion 210 or 310 according to step 104, the compact 202 or 302 is then sintered in place to form a sintered copper alloy powder metal portion 204 or 304 forming the composite component 200 or 300 shown in FIGS. 2B and 3B, respectively, according to step 106. Based on the aforementioned description, it will be appreciated that the compact 202 or 302 undergoes a dimensional change (either shrinkage as between FIGS. 2A and 2B or expansion as between FIGS. 3A and 3B) and as a result of this dimensional change, the sintered powder metal portion 204 or 304 is made to form an interference fit with the corresponding ferrous portion 210 or 310. In the case of FIG. 2B, the radially-inward facing surface 216 or inner periphery of the sintered powder metal portion 204 is shrunk onto the radially-outward facing surface 212 or outer periphery of the ferrous portion 210. What this means is that the inner diameter, inner circumference, or inner periphery of the compact 202 is smaller than the inner diameter, inner circumference, or inner periphery of the sintered powder metal portion 204 indicating shrinkage. In the case of FIG. 3B, the radially-outward facing surface 318 or outer periphery of the sintered powder metal portion 304 is expanded onto the radially-inward facing surface 314 or outer periphery of the ferrous portion 310. In this instance, the outer diameter, outer circumference, or outer periphery of the compact 302 is greater than the outer diameter, outer circumference, or outer periphery of the sintered powder metal portion 304 indicating dimensional expansion during sintering.

Effectively this dimensional change creates a "sinter fit" in which the powder metal portion is joined with a second portion (here, the ferrous backing portion) through an interference fit, as the result of the sintering. This joins the two portions together in a way that prevents their movement relative to one another either axially or rotationally.

It is further noted that the sintering temperatures that are used during step 106 to sinter the compact may also be used to austenitize the ferrous portion 210 or 310 of the composite component 200 or 300 contemporaneously with sintering according to step 108 (which is shown in dashed lines to indicate that this contemporaneous sintering/heat treating may or may not occur based on the selected materials). That is to say, some of the ferrite in the ferrous portion 210 or 310 can be turned into austenite during the sintering of the brass or bronze powder metal. Because the austenitization temperature can vary depending on carbon content of the ferrous portion as well as other factors, if austenitization is to be achieved, then it may be most practical to select a ferrous composition that has an austenitization temperature below the sintering temperature for the particular brass or bronze alloy.

In the event that austenitization occurs in step 108 contemporaneously with sintering, then the subsequent steps of rapidly cooling the composite component after sintering/austenitization to form martensite from at least a portion of the austenite according to step 110 and of tempering the formed martensite according to step 112 may be performed to the ferrous portion 210 or 310. The rate of quench under step 110 to achieve a particular percent martensite in the microstructure may be arrived at from the literature using TTT (time-temperature-transition) charts for the particular ferrous composition. Further, under step 112, to reduce brittleness, the martensite can be tempered, which can occur at a temperature significantly below the sintering temperature, such that the brass or bronze portion of the composite component do not substantially further sinter.

After sintering step 106 (or if austenization occurs, after tempering step 112), the sintered copper alloy powder metal portion 204 or 304 may be sized such that the remaining exposed surface of the sintered copper alloy powder metal portion 204 or 304 (for example, either the outwardly facing surface 220 in FIG. 2B or the inwardly facing surface 322) can be used as a bearing surface. It is further contemplated that to improve frictional qualities, this surface may be oil impregnated to provide self-lubrication.

Among the benefits of the disclosed structure and method are that the formed composite component provides a strong iron or steel backing for the brass or bronze material, which have increased strength and modulus in comparison to a purely brass or bronze component. Further, the ferrous component (even if pre-fabricated separately from powder metal) is not subject to significant distortion at typical sintering temperatures for brass and bronze and therefore the ferrous portion provides a surrounding structure that reduces dimension distortion of the brass or bronze portion. Still yet another potential benefit is that a bearing assembly can be provided having a hardened wear resistant surface (by heat treating the ferrous portion contemporaneously with the sintering) that is coupled with a bearing. This may be beneficial in certain bearing constructions or structures such as those involving rotating shafts.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A method of forming a composite component having a sintered copper alloy powder metal portion and a ferrous portion, the method comprising:
compacting a copper-containing powder metal to form an unsintered copper-containing powder metal compact, the copper-containing powder metal including copper and tin such that the copper-containing powder metal is a Cu—Sn bronze material;
positioning the unsintered copper-containing powder metal compact adjacent to the ferrous portion with an initial clearance between the unsintered copper-containing powder metal compact and the ferrous portion;

sintering the unsintered copper-containing powder metal compact to form the sintered copper alloy powder metal portion, the step of sintering occurring at a temperature which also austenitizes the ferrous portion of the composite component; and cooling the composite component after sintering, in which the step of cooling occurs rapidly enough to transform at least some of the austenite formed during sintering into martensite;

whereby, during sintering the unsintered copper-containing powder metal compact to form the sintered copper alloy powder metal portion, a dimensional change in the unsintered copper-containing powder metal compact results in an interference fit of the sintered copper alloy powder metal portion with the ferrous portion to join the sintered copper alloy powder metal portion and the ferrous portion together to form the composite component such that a surface of the sintered copper alloy powder metal portion directly contacts a surface of the ferrous portion.

2. The method of claim 1, wherein, due to the material composition of the sintered copper alloy powder metal portion, the dimensional change in the unsintered copper-containing powder metal compact to the sintered copper alloy powder metal portion during sintering involves an increase of a dimension to cause the interference fit.

3. The method of claim 1, wherein positioning the unsintered copper-containing powder metal compact adjacent to the ferrous portion includes placing the unsintered copper-containing powder metal compact inside an opening in the ferrous portion.

4. The method of claim 3, wherein, upon sintering, the unsintered copper-containing powder metal compact expands as the unsintered copper-containing powder metal compact is sintered to form the sintered copper alloy powder metal portion, thereby creating the interference fit between an outer periphery of the sintered copper alloy powder metal portion and an inner periphery of the ferrous portion.

5. The method of claim 4, wherein a circumference of the unsintered copper-containing powder metal compact increases during sintering to form the sintered copper alloy powder metal portion.

6. The method of claim 1, wherein positioning the unsintered copper-containing powder metal compact adjacent to the ferrous portion includes placing the ferrous portion inside an opening in the unsintered copper-containing powder metal compact.

7. The method of claim 6, wherein, upon sintering, the unsintered copper-containing powder metal compact shrinks as the unsintered copper-containing powder metal compact is sintered to form the sintered copper alloy powder metal portion, thereby creating the interference fit between an inner periphery of the sintered copper alloy powder metal portion and an outer periphery of the ferrous portion.

8. The method of claim 7, wherein a circumference of the unsintered copper-containing powder metal compact decreases during sintering to form the sintered copper alloy powder metal portion.

9. The method of claim 1, wherein the sintered copper alloy powder metal portion is annular and the ferrous portion is annular.

10. The method of claim 1, wherein the ferrous portion is at least one of iron, an iron alloy, steel, and a steel alloy.

11. The method of claim 1, further comprising the step of fabricating the ferrous portion using wrought forming, casting, or powder metallurgy.

12. The method of claim 1, wherein the composite component is a bearing and the sintered copper alloy powder metal portion includes a bearing surface.

13. The method of claim 1, further comprising the step of tempering the martensite in the ferrous portion of the composite component.

14. The method of claim 1, further comprising the steps of sizing the sintered copper alloy powder metal portion and impregnating the sintered copper alloy powder metal portion with oil.

15. The method of claim 1, wherein the ferrous portion is not sintered during the sintering step.

16. A composite component comprising:

a sintered copper alloy powder metal portion with a material composition including copper and tin to provide a Cu—Sn bronze; and a ferrous portion, the ferrous portion adjacent to and forming an interference fit with the sintered copper alloy powder metal portion as a result of a dimensional change of an unsintered copper-containing powder metal during the sintering of the unsintered copper-containing powder metal compact to form the sintered copper alloy powder metal portion and a surface of the ferrous portion directly contacts a surface of the sintered copper alloy powder metal portion, wherein the sintering occurs at a temperature which also austenitizes the ferrous portion of the composite component, and wherein at least some of the austenite is transformed into martensite by rapid cooling after sintering and subsequently tempered.

17. The composite component of claim 16, wherein the ferrous portion is located in an opening of the sintered copper alloy powder metal portion and an inner periphery of the sintered copper alloy powder metal portion forms an interference fit with an outer periphery of the ferrous portion.

18. The composite component of claim 16, wherein the sintered copper alloy powder metal portion is located in an opening of the ferrous portion and an inner periphery of the ferrous portion forms an interference fit with an outer periphery of the sintered copper alloy powder metal portion.

19. The composite component of claim 16, wherein the ferrous portion is at least one of iron, an iron alloy, steel, and a steel alloy.

20. The composite component of claim 16, wherein the ferrous portion is formed using wrought forming, casting, or powder metallurgy.

21. The composite component of claim 16, wherein the sintered copper alloy powder metal portion is annular and the ferrous portion is annular.

22. The composite component of claim 16, wherein the composite component is a bearing and the sintered copper alloy powder metal portion includes a bearing surface.

23. The composite component of claim 16, wherein the sintered copper alloy powder metal portion is impregnated with oil.

* * * * *